Aug. 16, 1955     J. F. ASTI     2,715,686
LINEAR DYNAMOELECTRIC MACHINE WITH LIQUID
ARMATURE AND SERIES EXCITATION
Filed Nov. 12, 1953
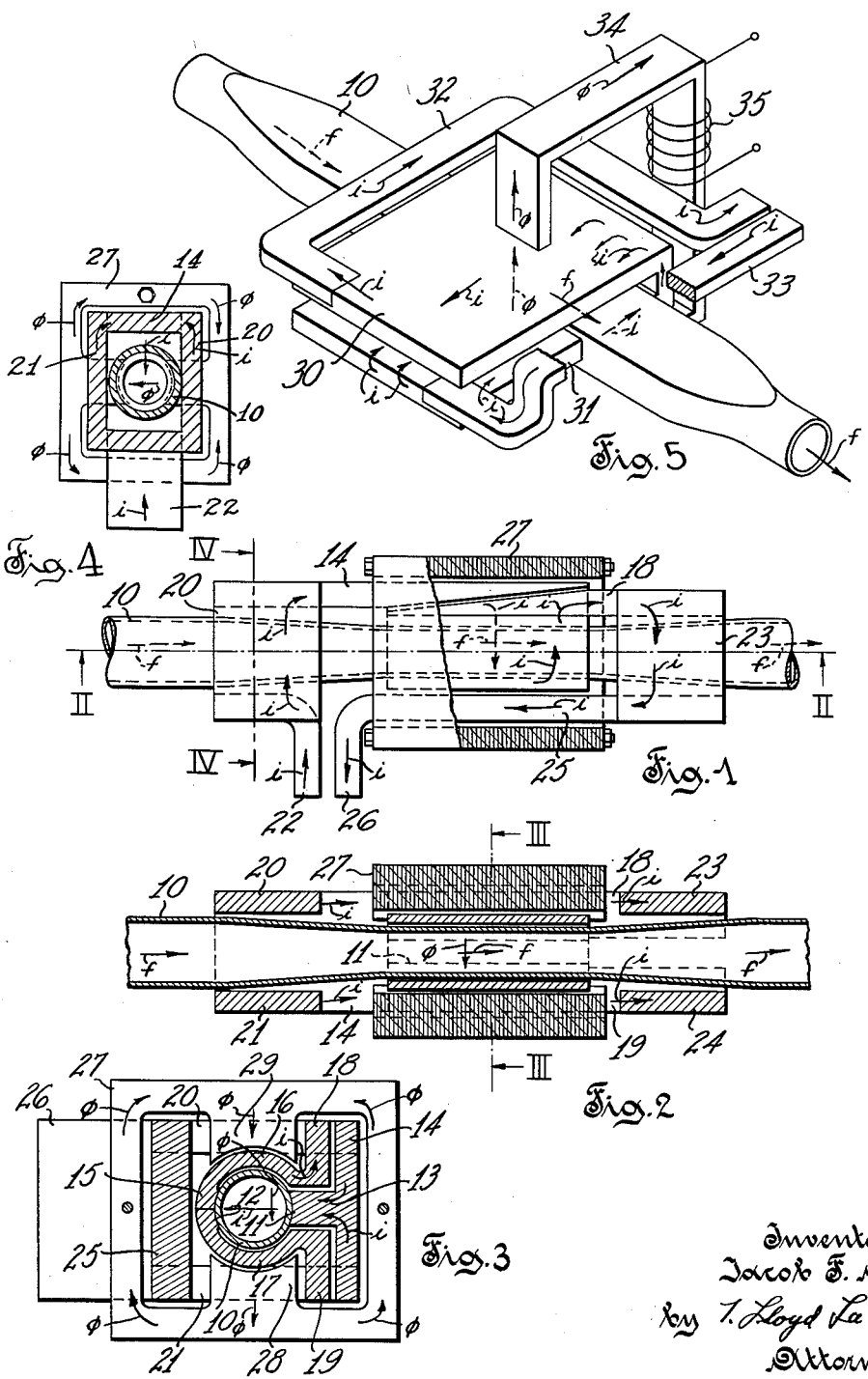

United States Patent Office 2,715,686
Patented Aug. 16, 1955

2,715,686

LINEAR DYNAMOELECTRIC MACHINE WITH LIQUID ARMATURE AND SERIES EXCITATION

Jacob F. Asti, Waukesha, Wis., assignor to Allis-Chalmers Manufacturing Company, Milwaukee, Wis.

Application November 12, 1953, Serial No. 391,462

8 Claims. (Cl. 310—11)

This invention relates to a dynamoelectric machine having an electrically conductive fluid which passes therethrough and relates more particularly to a direct current linear electromagnetic pump or generator having current compensation and series excitation.

In such a dynamoelectric machine when operated as a direct current electromagnetic pump, an armature current flows through the pumped liquid at right angles to the flow of the liquid and a magnetic field is established at right angles to both the fluid flow and the current for causing pumping of the fluid. The portion of the conduit having electrodes for passing electric current through fluid within the magnetic field is referred to as the throat of the pump.

Such pumps are relatively low voltage and high current machines and heretofore have been relatively inefficient, have developed but limited pump pressures, and were operated at only relatively low temperatures. Providing such direct current linear electromagnetic pumps with current compensation has greatly increased the efficiency of the machines and has removed the major limitation to pressure that could be developed by the pump.

According to this invention lead conductors are connected in series circuit with the series loop formed by the armature or throat conductor and a compensating current conductor and arranged therewith to effect a conductor turn about the throat of the pump in a plane substantially parallel to both the conduit and the direction of the armature current in the fluid to provide both excitation and compensation for the pump. The lead conductors are also constructed and arranged to cooperate with the throat conductor and the compensating current conductors to form a conductor turn about the throat of the pump substantially equivalent to a conductor turn in the plane of symmetry of the conduit to provide both excitation and compensation for the pump. With such arrangement of the lead conductors the iron core may be omitted from the magnetic circuit and the operating temperature of the pump therefore need be limited only by the limiting temperature of the metal of the conduit or the metal of the conductors. The pump may therefore carry series field current of any value dependent only on the current capacity of the conductors.

It is therefore an object of the present invention to provide a direct current dynamoelectric machine such as a linear electromagnetic pump or generator with current compensation and series excitation.

Another object is to provide a direct current linear electromagnetic pump or generator which is very easy to build and to assemble, and has substantially no limiting operating temperature.

Another object is to provide a linear dynamoelectric machine such as a direct current electromagnetic pump which does not require an iron core or conventional coil structure.

Another object is to provide a linear dynamoelectric machine having a liquid armature with lead conductors constructed and arranged to effect a conductor turn about the armature in the plane of symmetry thereof.

Other objects and advantages will be apparent to one skilled in the art upon reading the following description together with the drawings, in which:

Fig. 1 is a plan view of a direct current linear dynamoelectric machine embodying the present invention with a portion thereof broken away;

Fig. 2 is a cross sectional view taken along the line II—II of Fig. 1;

Fig. 3 is a cross sectional view taken along the lines III—III of Fig. 2;

Fig. 4 is a sectional view taken on line IV—IV of Fig. 1; and

Fig. 5 is a perspective view of a modification of the machine shown in Figs. 1 to 3.

A linear dynamoelectric machine employing a liquid armature, series excitation and current compensation is described for operation as an electromagnetic pump. This pump comprises a tube or conduit 10 for containing an electrically conductive fluid such as a liquid metal. The conduit may have any suitable shape but is preferably round as shown in Fig. 3. Electrodes 11 and 12 for the liquid armature are formed by a plate or bar 13 and by the junction of compensating current conductors 16, 17, respectively, with the electrodes secured at diametrically opposite sides of the throat portion of the conduit.

The compensating current conductors 16 and 17 comprise the sections of a longitudinally slotted copper sleeve 15 which encloses the conduit at the throat or armature portion of the pump. Bar 13 extends radially outward from the conduit through the slot in the sleeve. Sleeve 15 has a slightly larger internal diameter than the outer diameter of the conduit to provide spacing between the sleeve and the conduit except at electrode 12 where the sleeve is secured to the conduit by brazing or welding. Thus parallel connected compensating conductors 16 and 17 are connected in series with the armature.

Lead conductors are connected to the series connected armature and compensation conductors, and these lead conductors are constructed and arranged with respect thereto to form a conductor turn about the armature so that armature current in the leads of the series circuit produces a magnetic field through the armature and compensating conductor transversely of the direction of the electric current in the fluid and the flow of the fluid. In the drawing reference characters $i$, $\phi$ and $f$ indicate direction of current, flux and fluid flow, respectively.

One of the lead conductors comprises a plurality of serially connected portions including a terminal portion 26, a front portion or bar 25 which extends lengthwise of the throat on the front side of the conduit, a split conductor portion comprising parallel connected bars 23, 24, which cross above and below the conduit adjacent one end of sleeve 15, and a back portion comprising bars 18 and 19 which extend lengthwise of the throat on the back side of the conduit and which are connected to sleeve sections 16 and 17, respectively.

The other lead conductor comprises a plurality of serially connected portions including a terminal portion 22, a split conductor portion comprising parallel connected bars 20, 21, which cross above and below the conduit adjacent the other end of sleeve 15, and a back portion comprising bar 14 which extends lengthwise of the throat along the back side of the conduit and which is connected to the armature through plate 13.

The front portion of the lead conductors, bar 25, carries current in one direction lengthwise of the conduit and the back portions of the lead conductors, bars 18, 19 and 14, carry current in the opposite direction lengthwise of the conduit. Bars 23, 24 of a first split conductor portion of the leads form parallel conducting paths above and below the conduit for carrying armature current in one direction across the conduit at one end of the pump. Bars 20, 21 of a second split conductor portion of the leads form parallel conducting paths above and below the conduit for carrying armature current in the opposite direction across the conduit at the other end of the pump. This arrangement of the lead conductors provides for minimum of spacing between the portions of the lead conductors and the throat portion of the conduit so that the flux linking the portions of the conductor turn pass through the compensating conductors and the fluid in the conduit portion enclosed by the compensating conductors with the lines of flux substantially normal to the armature current. The series circuit comprising the lead conductors, the armature and the compensation conductors effect a conductor turn about the throat of the conduit in the plane of symmetry of the conduit so that current in the series circuit produces a magnetic field transversely of the direction of the current in the armature and the flow of the fluid.

The electric current which passes in one direction through the liquid metal returns by way of the sleeve sections adjacent opposite sides of the conduit with the current flow in a direction opposite to the direction of the current through the fluid. The current in the sleeve sections thus cancels the magnetic effect which the current in the fluid has on the distribution of the field flux, and the resulting field flux is therefore uniformly distributed.

This series excited and compensated pump thus far described does not requires an iron core. An iron core 27 may be provided as shown, however, and it comprises pole pieces 28, 29 diametrically disposed with respect to the conduit so that the field flux through the throat section is at right angles to both the current and to the direction of flow of the metal. The pole pieces are disposed adjacent the sleeve sections and have curved surfaces to correspond to that of the sleeve sections to provide minimum air gap between the poles. The lead conductors, the plate 13 and the compensating current sleeve effect a turn about the center leg of the core defined by pole pieces 28, 29. The core 27 is the three legged type with the center leg having an air gap therein defined by the pole pieces 28, 29.

The lead conductors and compensating current conductors are not provided with insulation but are separated from adjacent conductors, the core, and the conduit by at least relatively small air spaces. The field poles may seat on the compensating conductors without electrical insulation, but, are preferably spaced a small distance therefrom. Suitable insulation may be disposed in such space to provide a heat barrier between the field poles and the compensation conductors.

In the operation of the linear dynamoelectric machine as an electromagnetic pump, unidirectional current is applied to terminals 22 and 26. For pumping fluid in a predetermined direction the current flow is from the source to terminal 22 through the fluid to terminal 26. For fluid flow to the right as indicated by the $f$ arrows in Figs. 1 and 2, the relative directions of the electric current and the lines of flux are indicated by the $i$ arrows and the $\phi$ arrows in their respective circuits. The current flows from terminal 22 in parallel paths in bars 20, 21, above and below the conduit, to bar 14, then to bar 13 and electrode 11 through the fluid to electrode 12. From electrode 12 the current flows in parallel paths in sleeve members 16, 17, bars 18, 19, bars 23 and 24, above and below the conduit, respectively, to bar 25 and terminal 26 back to the source. The applied current flows in a series circuit through one lead conductor forming a portion of a conductor turn about the armature, through the liquid armature and compensating current conductors, and through another lead conductor forming another portion of the conductor turn about the armature to produce a magnetic field through the armature and the compensation conductors and cause pumping of the fluid. The conductor turn about the armature is also a conductor turn about the center leg of the magnetic core with the split portions of the leads forming parallel conducting paths carrying the current about the upper and lower portions of the center leg of the core.

In the operation of the linear dynamoelectric machine as a generator, the electrically conductive fluid flows through the throat of the conduit. The residual magnetism of the core produces a magnetic field so that the fluid flowing through such field initiates generator action. The initial armature current generated flows through the series circuit as series excitation and builds up the magnetic field. If the machine is to be operated as a generator without an iron core, or if the residual magnetism of a core is not sufficient to initiate generator action, means must be provided to produce at least a temporary magnetic field for initiating the generator action. Such means may comprise a removable permanent magnet or a removable energized field coil (not shown) disposed over a compensating current conductor above the throat of the conduit until generator action has started and the field is self-sustaining. Such operation without the iron core removes the temperature limitation of the core from the operation of the machine.

The embodiment of the invention shown in Fig. 5 differs essentially from that shown in Fig. 1 in having only a single compensating current conductor 30 and in not having an iron core. An iron core may, however, be provided. Conductor 30 and a throat conductor 31 comprise superposed parallel plates connected in series for conducting current through the liquid metal in the throat of the conduit 10 and conducting such current back across the conduit within the magnetic field.

A lead conductor 32 is secured to the free end of plate 30 and a lead conductor 33 is secured to the free end of conductor 31. Lead conductors 32, 33 extend across the conduit 10 adjacent to plate 30 and along opposite sides thereof. The lead conductors cooperate with the plates 30, 31 to effect a conductor turn about the current carrying portion of the throat of conduit 10. As described, the machine will operate satisfactorily as a pump when unidirectional current is supplied to the lead conductors 32, 33. A suitable magnetic field must be provided, however, to initiate generator action when the machine is to be operated as a generator. Such field may be provided by an energized field removably positioned above plate 30 and conduit 10 such as the U-shaped core 34 disposed, as shown, with a pole above plate 30 and the other pole below conduit 10. The core is excited by a winding 35 when connected to a source of excitation current. The core 34, if desired, may be removed when the field is self-sustaining.

While only two embodiments of the invention have been shown and described, it will be apparent to one skilled in the art that various changes may be made therein without departing from the spirit of the invention or from the scope of the appended claims.

It is claimed and desired to secure by Letters Patent:

1. A linear direct current dynamoelectric machine operable as an electromagnetic generator or as an eletromagnetic pump comprising a conduit containing an electrically conductive fluid serving as the armature for said machine, a compensation conductor disposed adjacent said armature and connected in series with said armature for conducting armature current adjacent said armature in a direction opposite its direction in said armature, a first lead conductor connected to said armature and crossing said conduit adjacent one end of said armature to form a portion of a conductor turn about said armature, a second lead conductor crossing said conduit adjacent the other end of said armature to form another portion of the conductor turn about said armature, said lead conductors, said armature and said compensation conductor being connected in a series circuit effecting a conductor turn about said armature to provide series excitation producing a magnetic field through said armature and said compensation conductor substantially normal to said armature current and the flow of said fluid.

2. A linear direct current dynamoelectric machine operable as an electomagnetic generator or as an electromagnetic pump comprising a conduit containing an electrically conductive fluid serving as the armature for said machine, a magnetic core having poles spaced apart by said armature to provide a magnetic field through said armature when said poles are excited, a first lead conductor connected to said armature and crossing said conduit adjacent one end of said armature to form a portion of a conductor turn about one of said poles, a second lead conductor crossing said conduit adjacent the other end of said armature to form another portion of the conductor turn about one of said poles, said lead conductors, and said armature connected in a series circuit to effect said conductor turn to provide series excitation producing the magnetic field through said armature.

3. A linear direct current dynamoelectric machine operable as an electromagnetic generator or as an electromagnetic pump comprising a conduit containing an electrically conductive fluid serving as the armature for said machine, a magnetic core having poles spaced apart by said armature to provide a magnetic field through said armature when said poles are excited, a compensation conductor disposed adjacent said armature within said magnetic field and connected in series with said armature for conducting armature current adjacent said armature in a direction opposite its direction in said armature, a first lead conductor connected to said armature and crossing said conduit adjacent one end of said armature to form a portion of a conductor turn about said armature, a second lead conductor crossing said conduit adjacent the other end of said armature to form another portion of the conductor turn about said armature, said lead conductors, said armature and said compensation conductor connected in a series circuit to effect a conductor turn about one of said field poles to provide series excitation producing the magnetic field through said armature normal to said armature current and the flow of said fluid.

4. A linear direct current dynamoelectric machine operable as an electromagnetic generator or as an electromagnetic pump comprising a conduit containing an electrically conductive fluid serving as the armature for said machine, a compensation conductor disposed above said armature and a compensation conductor disposed below said armature connected in parallel with each other and in series with said armature for conducting armature current above and below said armature and adjacent thereto in a direction opposite its direction in said armature, a first lead conductor split to cross above and below said conduit adjacent one end of said armature to form a portion of a conductor turn about said armature, a second lead conductor split to cross above and below said conduit adjacent the other end of said armature to form another portion of the conductor turn about said armature, said lead conductors, said armature and said compensating conductors being connected in a series circuit effecting a conductor turn about said armature in the plane of symmetry of the conduit to provide series excitation producing a magnetic field through said compensation conductors and said armature.

5. A linear direct current dynamoelectric machine operable as an electromagnetic generator or as an electromagnetic pump comprising a conduit containing an electrically conductive fluid serving as the armature for said machine, a magnetic core having poles spaced apart by said armature to provide a magnetic field through said armature when said poles are excited, a compensation conductor disposed above said armature and a compensation conductor disposed below said armature connected in parallel with each other and in series with said armature for conducting armature current within said magnetic field adjacent said armature in a direction opposite its direction in said armature, a first lead conductor connected to said armature and split to cross above and below said conduit adjacent one end of said armature to form a portion of a conductor turn about said armature, a second lead conductor split to cross above and below said conduit adjacent the other end of said armature to form another portion of the conductor turn about said armature, said lead conductors, said armature and said compensation conductors connected in a series circuit to effect said conductor turn about said armature in the plane of symmetry of the conduit to provide series excitation for said field poles.

6. A linear direct current dynamoelectric machine operable as an electromagnetic generator or as an electromagnetic pump comprising a tube containing an electrically conductive fluid, a conductive sleeve disposed about said tube and spaced therefrom, said sleeve having a slot extending longitudinally thereof, a conductor bar extending through said slot and secured to said tube to form an electrode therein, means connecting said sleeve to said tube diametrically opposite said bar to form a second electrode therein to pass electric current through the fluid transversely to the flow of the fluid, a lead conductor connected to said sleeve adjacent said slot and extending across said tube adjacent one end of said sleeve, another lead conductor connected to said bar and extending across said tube adjacent the other end of said sleeve, said lead conductors, said conductor bar and said sleeve forming a series circuit providing a conductor turn about the current carrying portion of the fluid to produce a magnetic field through the fluid and said sleeve at right angles to both the flow of said fluid and the current in said fluid when current flows in said series circuit and also providing compensation for the effect on said field of the current through said fluid.

7. A linear direct current dynamoelectric machine operable as an electromagnetic generator or as an electromagnetic pump comprising a conduit containing an electrically conductive fluid serving as the armature for said machine, a compensation conductor disposed above said armature and a compensation conductor disposed below said armature connected in parallel with each other and in series with said armature for conducting armature current above and below said armature and adjacent thereto in a direction opposite its direction in said armature, lead conductors for said series connected armature and compensation conductors comprising first and second split conductors, said first split conductor comprising parallel conducting paths disposed above and below said conduit adjacent said compensation conductors for carrying current in one direction across the conduit at one end of said armature, said second split conductor comprising parallel conducting paths disposed above and below said conduit adjacent said compensation conductors for carrying current in the opposite direction across said conduit at the other end of said armature, said lead conductors effecting a conductor turn about said armature in a plane of symmetry of said conduit to provide series excitation producing a magnetic field through said compensation conductors and said armature.

8. A linear direct current dynamoelectric machine operable as an electromagnetic generator or as an electromagnetic pump comprising a conduit containing an electrically conductive fluid serving as the armature for said machine, a compensation conductor disposed above said armature and a compensation conductor disposed below said armature connected in parallel with each other and in series with said armature for conducting armature current above and below said armature and adjacent thereto in a direction opposite its direction in said armature, lead conductors for said series connected armature and compensation conductors comprising first and second split conductors and conductor portions in series with said first and second split conductors, said conductor portions extending lengthwise of said conduit on opposite sides thereof and carrying current in opposite directions, said first split conductor comprising parallel conducting paths disposed above and below said conduit adjacent said compensation conductors for carrying current in one direction across the conduit at one end of said armature, a second split conductor comprising parallel conducting paths disposed above and below said conduit adjacent said compensation conductors for carrying current in the opposite direction across said conduit at the other end of said armature, said lead conductors effecting a conductor turn about said armature in a plane of symmetry of said conduit to provide series excitation producing a magnetic field through said compensation conductors and said armature.

No references cited.